(12) United States Patent
Graham

(10) Patent No.: US 7,931,121 B2
(45) Date of Patent: Apr. 26, 2011

(54) TRANSFER PLATFORM

(75) Inventor: Larry Graham, Hollsopple, PA (US)

(73) Assignee: Haverfield International Incorporated, Gettysburg, PA (US)

( * ) Notice: Subject to any disclaimer, the term of this patent is extended or adjusted under 35 U.S.C. 154(b) by 775 days.

(21) Appl. No.: 11/975,872

(22) Filed: Oct. 22, 2007

(65) Prior Publication Data

US 2009/0101439 A1 Apr. 23, 2009

(51) Int. Cl.
*E04G 3/30* (2006.01)
(52) U.S. Cl. .......................... 182/92; 182/150; 248/219.3
(58) Field of Classification Search .................. 182/92, 182/93, 150; 248/219.3
See application file for complete search history.

(56) References Cited

U.S. PATENT DOCUMENTS

| | | | |
|---|---|---|---|
| 503,411 A | 8/1893 | Field | |
| 3,035,802 A | 5/1962 | Wyman et al. | |
| 3,497,033 A * | 2/1970 | Herrenkohl | 182/92 |
| 3,604,371 A | 9/1971 | Cavalucci | |
| 3,863,736 A | 2/1975 | McWilliams | |
| 4,048,779 A | 9/1977 | Valenziano et al. | |
| 4,228,894 A * | 10/1980 | Lyles | 312/235.2 |
| 4,459,649 A * | 7/1984 | Shaneour | 362/396 |
| 4,478,312 A | 10/1984 | Kurtgis | |
| 5,131,494 A * | 7/1992 | Heifetz | 182/106 |
| 5,275,359 A | 1/1994 | De Forges de Parny et al. | |
| 5,445,352 A | 8/1995 | Long | |
| 5,603,389 A | 2/1997 | Zemon | |
| 5,709,057 A * | 1/1998 | Johnson et al. | 52/301 |
| 6,167,988 B1 * | 1/2001 | Frodge et al. | 182/107 |
| 6,769,514 B2 | 8/2004 | Ed | |
| 6,994,186 B2 | 2/2006 | Ed | |
| 7,137,605 B1 | 11/2006 | Guertler | |
| 2003/0230684 A1 * | 12/2003 | Clary | 248/219.2 |

* cited by examiner

Primary Examiner — Alvin C Chin-Shue
(74) Attorney, Agent, or Firm — Stuart J. Friedman

(57) ABSTRACT

A transfer platform for safely transferring a lineman from a helicopter to a utility pole includes a cylindrical hollow member dimensioned to closely fit over the top of the pole, the member having an open lower end and a top cap closing the upper end thereof, the top cap abutting the top of the pole when the member is positioned on the pole, a step extending sidewardly from the member, the step being substantially parallel to and lower than the top cap and an equipment support assembly extending sidewardly from the member. An aperture is formed in the member beneath the underside of the step and an adjustable shim assembly extends through the aperture into the hollow of the member.

19 Claims, 5 Drawing Sheets

TRANSFER PLATFORM

FIELD OF THE INVENTION

The present invention relates to transfer platforms for utility poles and, more particularly, to a helicopter transportable, hand emplaceable transfer platform for power transmission poles.

BACKGROUND OF THE INVENTION

High voltage power transmission lines carrying voltages in the hundreds of kilowatt range have been constructed to extend from spaced towers or poles in terrain which is often practically inaccessible to land vehicles. In recent years, a number of methods and devices have been developed to facilitate the repair and maintenance of high voltage power transmission lines which are accessed by helicopter.

Helicopter transported landing platforms and work scaffolds which can be attached to the cross arm of a utility pole have been developed to permit a lineman to disembark from a helicopter and descend vertically along the utility pole to the power transmission lines supported thereby. Such devices are heavy and bulky, and must be suspended from and transported by a helicopter. The helicopter, with the suspended load, must be deftly maneuvered by the pilot, frequently with the assistance of helicopter crewman, to position and remove the landing platform and work scaffold from the arms of the utility pole. The operation of a helicopter with heavy platforms and scaffolding hanging below the helicopter in the vicinity of high voltage power transmission lines is a risky and dangerous undertaking, particularly in windy conditions.

Accordingly, there exists a need for a landing platform which may be safely emplaced on the utility pole, without need for extensive and dangerous helicopter maneuvering and, preferably, by a single lineman, which can be used to safely transfer a lineman from the helicopter to the utility pole and to support the lineman's equipment while he is on the pole.

SUMMARY OF THE INVENTION

It is, therefore, a primary object of the present invention to provide a novel and improved transfer platform for use in safely transferring a lineman from a helicopter to a utility pole.

It is also an object of the present invention to provide a novel and improved transfer platform which is lightweight and which can be hand emplaced by a lineman in a helicopter onto the top of a utility pole.

It is another object of the present invention to provide a novel and improved transfer platform which includes means for stabilizing the platform against rocking when emplaced atop the utility pole.

It is yet another object of the present invention to provide a novel and improved transfer platform which includes an equipment support assembly for supporting lineman's equipment.

It is still another object of the present invention to provide a novel and improved transfer platform which can be emplaced onto the top of a utility pole without damaging pole-top hardware, such as shield wire hardware.

The foregoing and other objects are achieved in accordance with the present invention by providing a transfer platform for safely transferring a lineman from a helicopter to a utility pole comprising a hollow member shaped and dimensioned to closely fit over the top of said pole, said member having an open lower end and a top cap closing the upper end thereof, said top cap abutting the top of said pole when said member is positioned on said pole, a step extending radially from said member, said step being substantially parallel to and lower than said top cap, and an equipment support assembly extending radially from said member. In a preferred embodiment, the hollow member is a cylindrical member to fit over the typically cylindrical top of utility poles.

In another aspect of the invention, there is provided a transfer platform wherein the equipment support assembly comprises bracket means extending radially from said member and an elongate equipment support bar supported by said bracket means. In a preferred embodiment, the bracket means includes at least two brackets extending radially from said member in spaced apart, generally parallel relationship. In a particularly preferred embodiment, the equipment support assembly supports a vertical lineman's ladder which hangs via hooks from the support bar.

In still another aspect of the invention, there is provided a transfer platform including an aperture in said member beneath the underside of said step and adjustable shim means extending through said aperture into the hollow of said member. In a preferred embodiment, the shim means comprises a pole contacting member positioned within the hollow of said member and a shim rod extending from said pole contacting member through said aperture, said shim rod being slidable in said aperture for moving said pole contacting member toward and away from said pole and including means for locking said rod against further sliding movement when said pole contacting means is in a desired position.

DETAILED DESCRIPTION OF THE INVENTION

Figure 1:
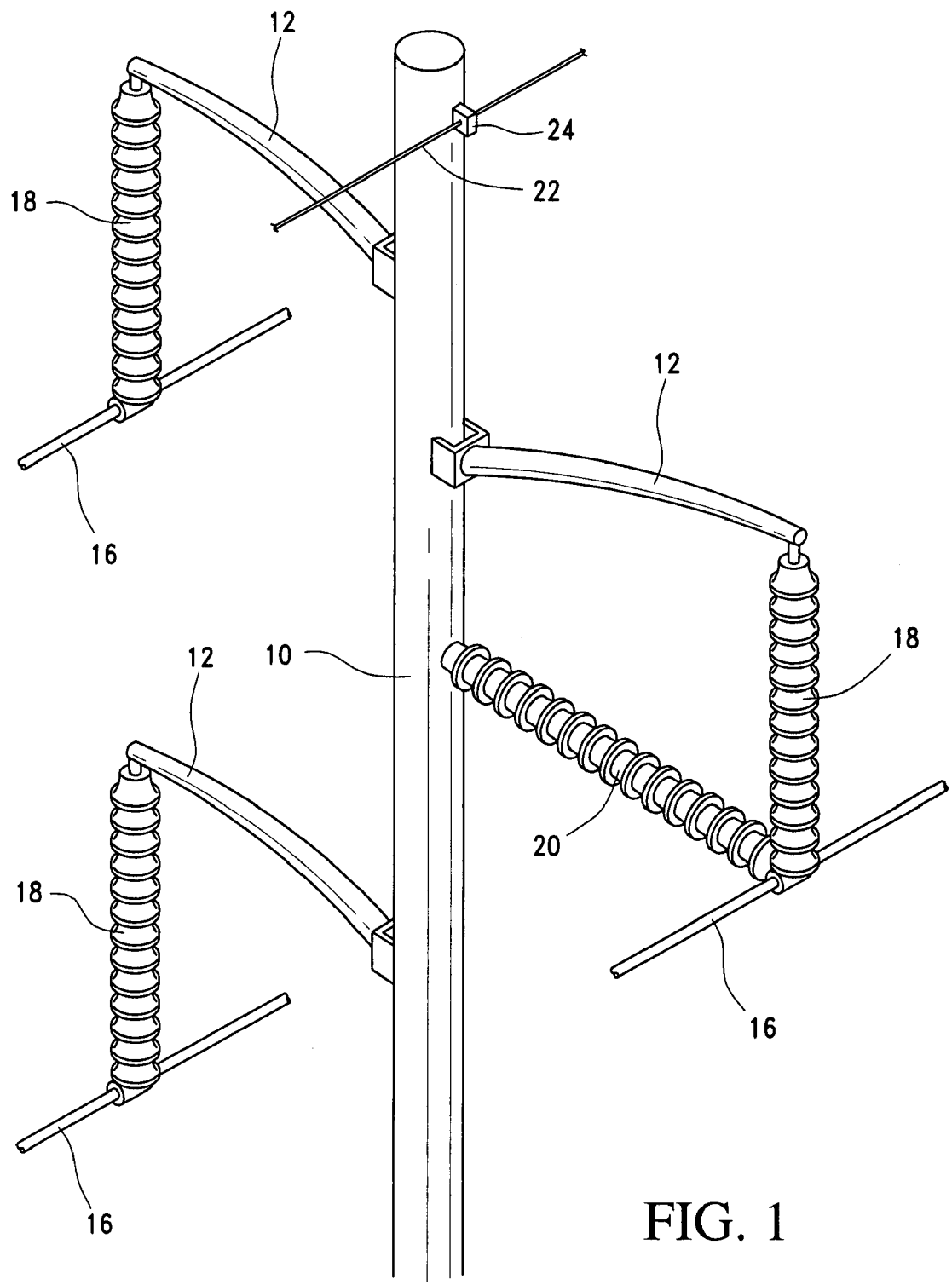
FIG. 1 is a perspective view of a typical utility pole for supporting high voltage power transmission lines.

Referring to FIG. 1 there is shown a conventional utility pole-type electrical power transmitting conductor supporting structure. It comprises a pole 10, which may be formed of wood, steel or other conventional power line pole material, having several conductor-supporting davit arms 12 extending in opposite directions from opposite sides of the pole 10. Frequently, pole 10 is supported by guide wires or cables 14 attached to the ground. Each conductor 16 is supported by a suspension insulator 18 depending from each of the davit arms 12. Sometimes the conductors 16 are also supported by strut insulators 20 to stabilize the conductors and hold them in position. In order to prevent lightening strikes on the high voltage conductors 16, each pole includes a shield wire 22 held onto the pole by shield wire hardware 24.

Referring to FIGS. 2-7, transfer platform 30 is designed to allow a lineman to leave a helicopter and to safely be placed upon a pole-type tower, as shown in FIG. 1. The platform 30 also serves as a ladder support to permit a vertical ladder 60 to be transferred from a helicopter to the platform 30 and to be supported from its top end and hang down from the platform to allow the lineman to move up and down the pole 10, as needed.

The transfer platform 30 includes a generally cylindrical hollow structure 32 having a diameter approximating, but no smaller than, the diameter of pole 10 and a top cap 34 closing the upper end of the hollow structure 32. A generally rectangular, vertically extending slot 36 is formed in the cylindrical hollow structure 32 and extends from the open bottom of hollow structure 32 more than half of the way toward top cap 34. The top cap 34 includes a handle 38 affixed to its upper surface which allows the platform 30 to be grasped by a lineman. In use, a lineman on a helicopter positions himself to allow him to place platform 30 upon the top of a pole 10, e.g., by standing on a skid of the helicopter or on a platform affixed to the skids of the helicopter or in a side door of the helicopter, while he is safely secured to the helicopter. The lineman grasps handle 38 of platform 30 and reaches toward the top of pole 10 in order to emplace platform 30 onto the top of pole 10 while the helicopter hovers near the pole. The platform is oriented such that slot 36 slides down over the shield wire hardware 24 without damaging it. Once the platform 30 is emplaced onto pole 10, the lineman steps onto platform 30 and transfers his secure connection from the helicopter to handle 38.

Platform 30 includes a hollow step 40 having a flat, planar upper surface and depending generally triangular side walls 42 extending radially outwardly from one side of and supported by cylindrical hollow structure 32, which the lineman can step onto when leaving the helicopter or on which the lineman can stand while performing maintenance and repair operations. Platform 30 also includes a vertically extending hand support bar 44 which is affixed to the outer cylindrical surface of structure 32 and which extends generally vertically upwardly therefrom in order to provide a hand support which the lineman can grasp when stepping onto platform 30 or while he is positioned on platform 30. Platform 30 also includes an equipment support assembly 46 for supporting lineman's equipment, such as a vertical lineman's ladder, desirably extending radially outwardly from and supported by the side of cylindrical hollow structure 32 which is diagonally opposite hollow step 40. Equipment support assembly 46 comprises at least two, preferably three, support brackets 48 extending outwardly from cylindrical hollow structure 32 in parallel, spaced relationship to each other. In a preferred embodiment each bracket 48 is quadrilateral with three sides 48a, 48b, 48c perpendicular to each other, side 48a being adjacent to and attached to the outer cylindrical surface of structure 32, perpendicular side 48b extending radially outwardly from cylindrical structure 32 and side 48c extending perpendicular to side 48b and parallel to side 48a. Each of the three support brackets 48 has an aperture 50 formed therein and generally positioned near the corner formed between sides 48b and 48c. The three apertures 50 are aligned so that a slidable equipment support bar 52 can pass through each of the apertures and extend generally horizontally relative to the generally vertical cylindrical sides of structure 32. The ends of bar 52 include removable caps 54 to prevent the bar 52 from inadvertently sliding through any of apertures 48, and possibly falling away.

Figure 2:
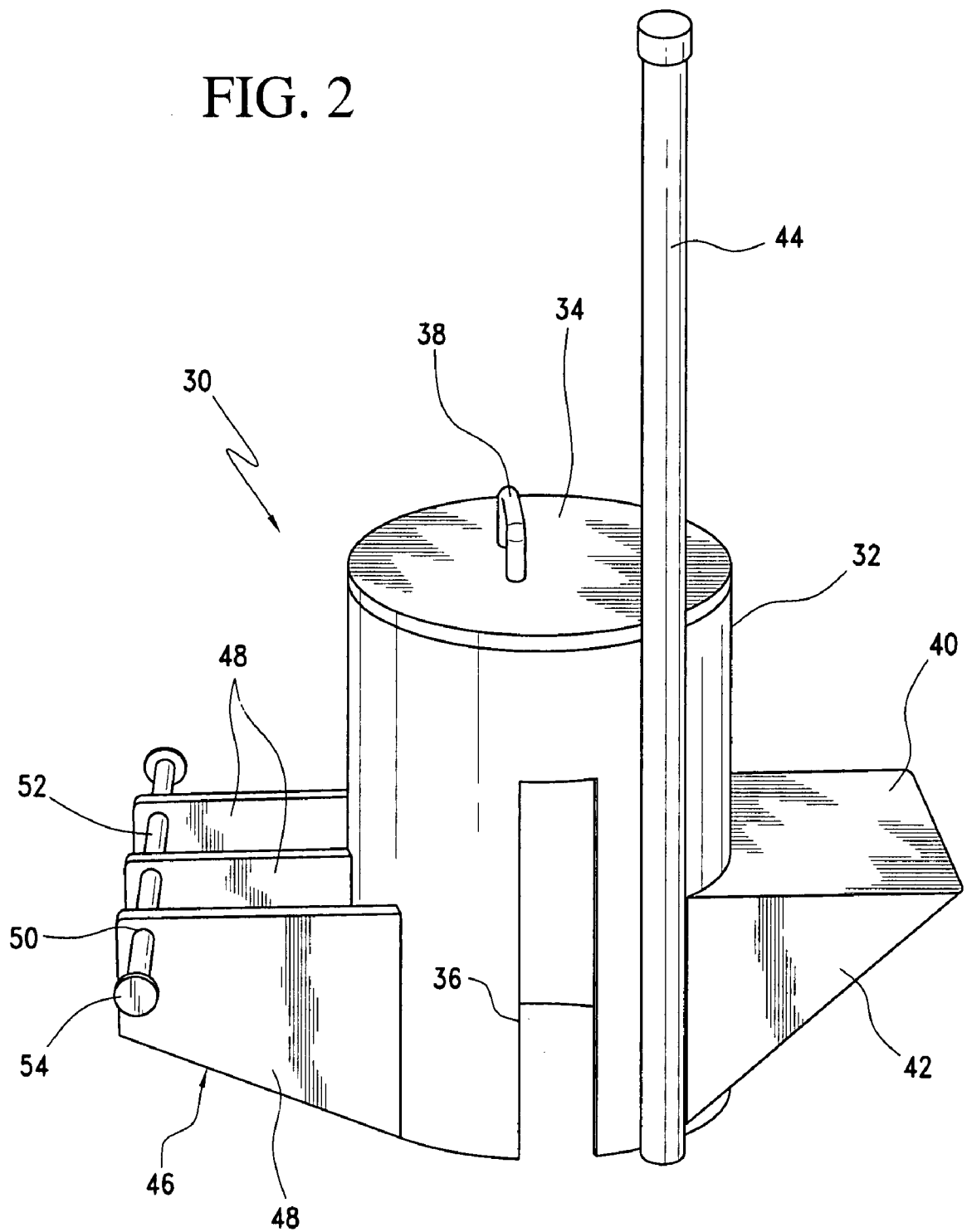
FIG. 2 is a front perspective view of the transfer platform of the present invention.
Figure 4:
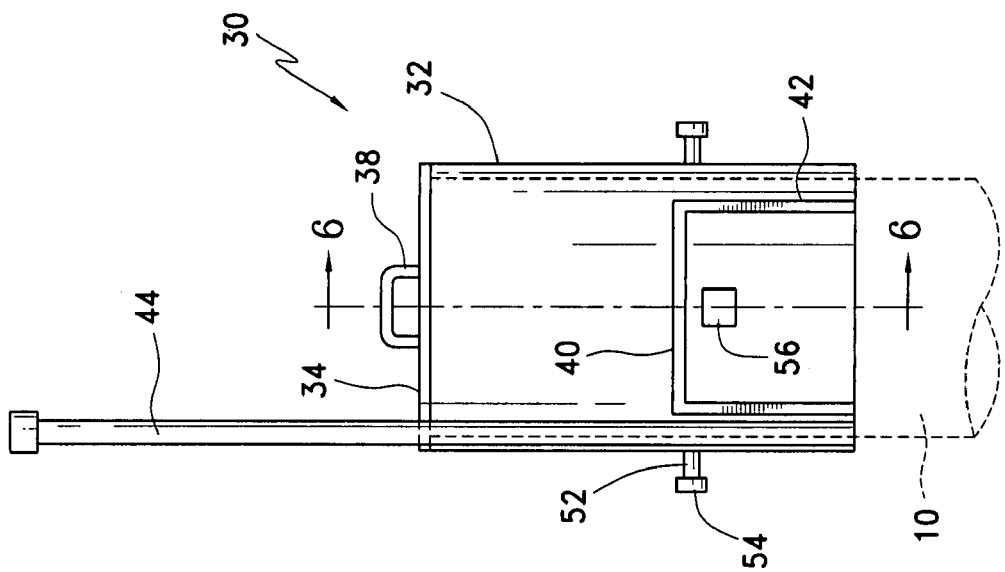
FIG. 4 is a right side elevational view of the transfer platform of FIG. 3.
Figure 3:
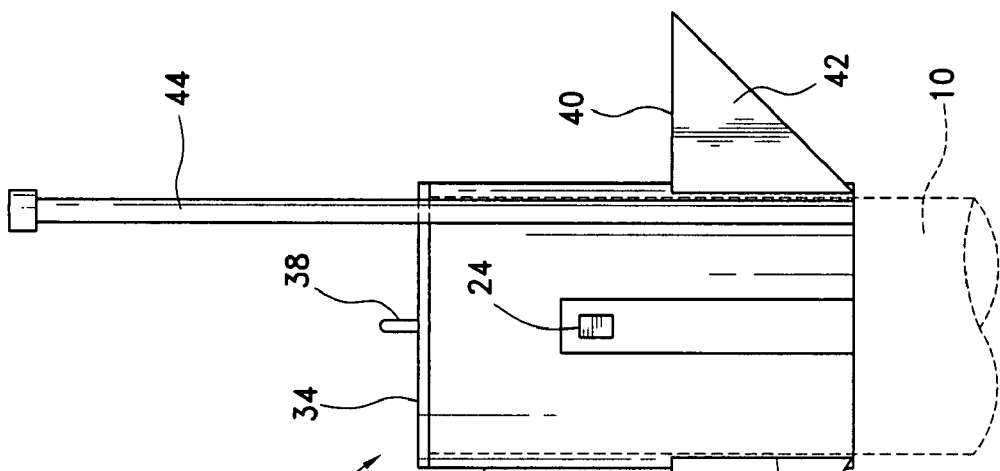
FIG. 3 is a front elevational view of the transfer platform of the present invention in place atop a utility pole.
Figure 5:
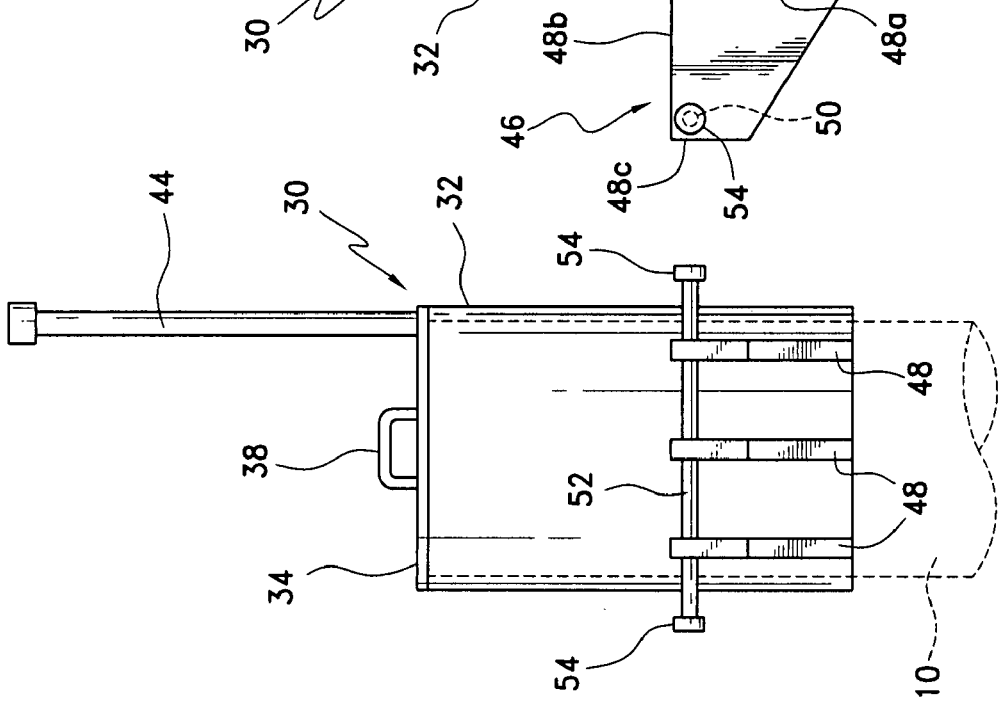
FIG. 5 is a left side elevational view of the transfer platform of FIG. 3.
Figure 6:
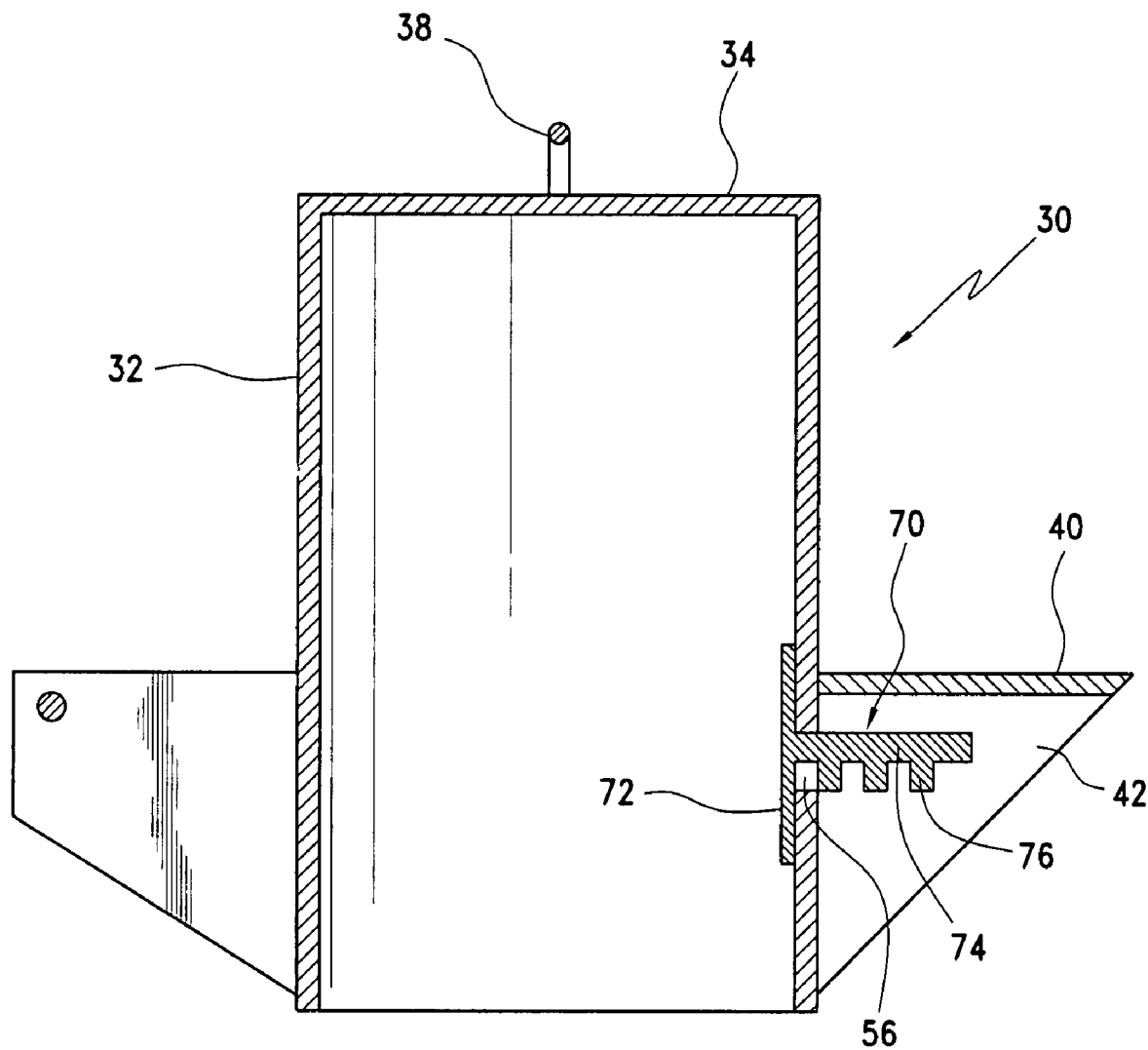
FIG. 6 is a partial sectional view taken along line 6-6 in FIG. 4 showing a means for stabilizing the platform against rocking when atop a utility pole.
Figure 7:
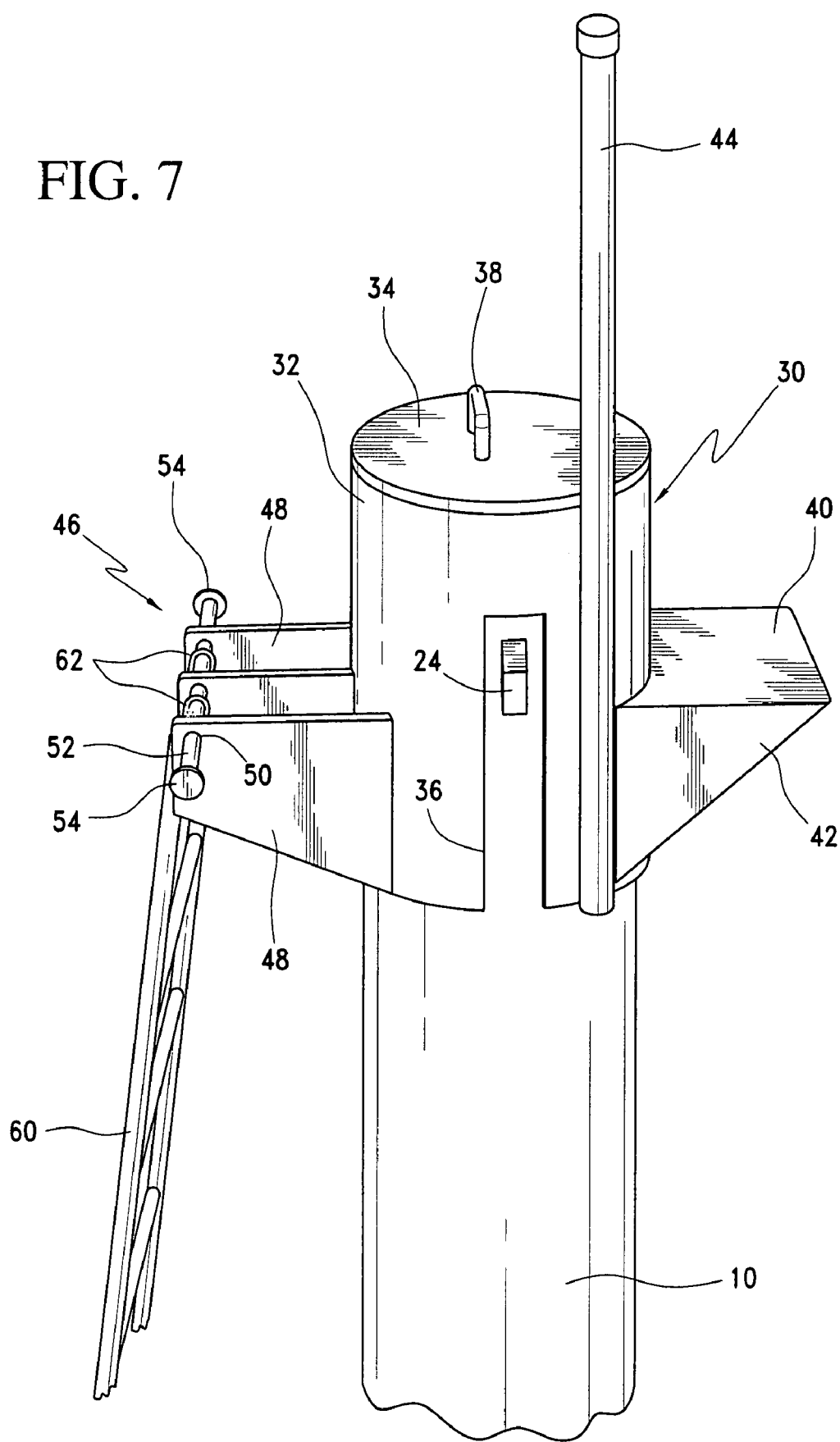
FIG. 7 is a perspective view of the transfer platform of the present invention in place atop a utility pole showing a vertical ladder hooked onto the equipment support assembly of the platform.

Before the transfer platform 30 is emplaced on pole 10, equipment support bar 52 is uncapped at one end, and the bar is slid through apertures 50 in the central and one end support brackets 48 and then recapped. This offsets the bar 52 in one direction so that when the platform is emplaced on pole 10, bar 52 does not strike shield wire 22. After the lineman is positioned on platform 30, the bar 52 is uncapped at the same end as before and is slid once again through apertures 50 in the central and one end support brackets 48, and then recapped, such that the bar 52 extends through apertures 50 in all three support brackets 48 and is oriented generally horizontal relative to the generally vertical cylindrical sides of structure 32, as shown in FIG. 2. A helicopter may then, using a sling, lift and deliver to platform 30 one or more items of lineman's equipment which may be supported from bar 52. Most typically, the equipment supported by bar 52 is a vertical ladder 60, generally having a length up to about 20 feet, which has two hooks 62 on one end thereof. With the aid of the lineman, the hooks 62 are placed over bar 52 and each hook 62 is positioned between the central and one end support bracket 48, with the ladder 60 hanging vertically down therefrom.

In one embodiment of the invention, shim means 70 are included with platform 30 to shim the cylindrical structure 32 so that it does not rock or wobble on the top of pole 10. An aperture 56 is formed in cylindrical structure 32 beneath the underside of step 40 and adjustable shin means 70 extends therethrough. The adjustable shim means 70 includes a pole contacting means 72 (desirably about ¼ inch thick), which is desirably arcuate and approximates the curvature of the cylindrical structure 32. Pole contacting means 72 is initially positioned within cylindrical structure 32 and adjacent its inner cylindrical surface, and a toothed shim rod 74 extends from the pole contacting means 72 through aperture 56. After the platform 30 is initially emplaced on pole 10, the lineman pushes the shim rod 74 inwardly toward the pole as far as it will go until the desirably arcuate pole contacting means 72 contacts pole 10, at which point the shim rod 74 is locked in position by engaging one of its teeth 76 onto the lower edge of aperture 56. Shim means 70 steadies the platform atop pole 10. Access to shim rod 74 from atop platform 30 is facilitated by the relatively short depending side walls 42 of hollow step 40.

While the present invention has been described in terms of specific embodiments thereof, it will be understood that no limitations are intended to the details of construction or design other than as defined in the appended claims.

The invention claimed is:

1. A transfer platform for safely transferring a lineman from a helicopter to a utility pole comprising:
   a hollow generally cylindrical member shaped and dimensioned to closely and removably fit over the top of a utility pole having a generally cylindrical top, said member having an open lower end and a top cap closing the upper end thereof, said top cap abutting the top of said pole when said member is positioned on said pole, and a generally cylindrical wall depending from said top cap and at least partially encircling said pole when said top cap abuts the top of said pole;
   a step having a flat, planar surface extending radially outwardly from and supported by said cylindrical wall, said step being substantially parallel to and vertically lower than said top cap, said step being dimensioned and structurally adequate to support a lineman standing thereon;
   support means for grasping by a lineman on said platform, said support means extending vertically upwardly from and supported by said member and projecting above said top cap wherein, said support means comprise an elongated bar attached to said generally cylindrical wall; and handle means for grasping said platform by a lineman on said helicopter, said platform being sufficiently lightweight whereby said lineman can emplace said platform on said pole.

2. A transfer platform, as claimed in claim 1, wherein said handle means extends upwardly from said top cap.

3. A transfer platform, as claimed in claim 1, further including an equipment support assembly extending radially outwardly from and supported by said member, said equipment support assembly including bracket means extending radially from said member and an elongated equipment support bar supported by said bracket means.

4. A transfer platform, as claimed in claim 3, wherein said bracket means includes at least two brackets extending radially from said member in spaced apart, generally parallel relationship.

5. A transfer platform, as claimed in claim 4, including an aperture in each bracket, said apertures in said brackets being aligned for receiving said equipment support bar therethrough and supporting said bar in a generally horizontal orientation when said member is positioned on said pole.

6. A transfer platform, as claimed in claim 5, wherein said bracket means includes three brackets.

7. A transfer platform, as claimed in claim 5, further including means on said equipment support bar for preventing the ends of said bar from sliding completely through any of said apertures.

8. A transfer platform, as claimed in claim 3, wherein said step and said equipment support assembly extend radially outwardly from diagonally opposite surfaces of said cylindrical member.

9. A transfer platform, as claimed in claim 1, further including an aperture formed in said member beneath the underside of said step and adjustable shim means extending through said aperture into the hollow of said cylindrical member for stabilizing said platform when said member is positioned on said pole.

10. A transfer platform, as claimed in claim 9, wherein said adjustable shim means comprises a pole contacting means positioned within the hollow of said member and a shim rod extending from said pole contacting means through said aperture, said shim rod being slidable in said aperture for moving said pole contacting means toward and away from said pole and including means for locking said rod against further sliding when said pole contacting means is in a desired position.

11. A transfer platform, as claimed in claim 10, wherein said hollow member is cylindrical and said pole contacting means comprises arcuate plate means having a curvature approximating that of said cylindrical member.

12. A transfer platform, as claimed in claim 10, wherein said shim rod includes a plurality of teeth along its length for engaging the edge of said aperture when said pole contacting means is in a desired position.

13. A transfer platform, as claimed in claim 10, wherein said step is hollow and includes depending side walls and said aperture is positioned between said side walls.

14. A transfer platform, as claimed in claim 1, further including a vertically extending slot formed in said cylindrical wall extending from said open lower end to a point intermediate the open end and said top cap.

15. A transfer platform for safely transferring a lineman from a helicopter to a utility pole comprising:
a hollow cylindrical member dimensioned to closely fit over the top of a utility pole having a generally cylindrical top, said member having an open lower end and a top cap closing the upper end thereof, said top cap abutting the top of said pole when said member is positioned on said pole, and a generally cylindrical wall depending from said top cap and at least partially encircling said pole when said top cap abuts the top of said pole;
a step having a flat, planar surface extending radially outwardly from and supported by said member, said step being substantially parallel to and vertically lower than said top cap, said step being dimensioned and structurally adequate to support a lineman standing thereon, an aperture in said member beneath the underside of said step and adjustable shim means extending through said aperture into the hollow of said member, said adjustable shim means comprising a pole contacting means positioned within the hollow of said member and a shim rod extending from said pole contacting means through said aperture, said shim rod being slidable in said aperture for moving said pole contacting means toward and away from said pole and including means for locking said rod against further sliding when said pole contacting means is in a desired position;
an equipment support assembly including at least two brackets extending radially outwardly from said member in spaced apart, generally parallel relationship and an elongated equipment support bar supported by said brackets, an aperture in each bracket, said apertures in said brackets being aligned for receiving said equipment support bar therethrough and supporting said bar in a generally horizontal orientation when said member is positioned on said pole;
support means for grasping by a lineman on said platform, said support means extending vertically upwardly from and supported by said member and projecting above said top cap wherein, said support means comprise an elongated bar attached to said generally cylindrical wall; and
handle means for grasping said platform by a lineman on said helicopter, said platform being sufficiently lightweight whereby said lineman can emplace said platform on said pole.

16. A transfer platform, as claimed in claim 15, wherein said handle means extends upwardly from said top cap.

17. A transfer platform, as claimed in claim 15, further including a vertically extending slot formed in said cylindrical wall extending from said open lower end to a point intermediate the open end and said top cap.

18. A method for safely transferring a lineman from a helicopter to a utility pole comprising the steps of:
providing a transfer platform on a helicopter, said transfer platform comprising
a hollow generally cylindrical member shaped and dimensioned to closely and removably fit over the top of a utility pole having a generally cylindrical top, said member having an open lower end and a top cap closing the upper end thereof, said top cap abutting the top of said pole when said member is positioned on said pole, and a generally cylindrical wall depending from said top cap and at least partially encircling said pole when said top cap abuts the top of said pole;
a step having a flat, planar surface extending radially outwardly from and supported by said member, said step being substantially parallel to and vertically lower than said top cap, said step being dimensioned and structurally adequate to support a lineman standing thereon;
support means for grasping by a lineman on said platform, said support means extending vertically upwardly from and supported by said member and projecting above said top cap wherein, said support means comprise an elongated bar attached to said generally cylindrical wall; and handle means for grasping said platform by a lineman on said helicopter, whereby said lineman can emplace said platform on or remove said platform from said pole;

hovering said helicopter near the top of said utility pole;

grasping said handle means by a person safely secured to said helicopter and emplacing said platform onto the top of said pole with said upper end of said pole received within said open lower end of said member and abutting said top cap for positioning said member on said pole;

transferring a lineman from said helicopter to said platform by said lineman stepping onto said flat, planar step of said platform while grasping said support means, said lineman transferring his secure connection from the helicopter to said platform.

19. A method, as claimed in claim 18, wherein said transfer platform further includes adjustable shim means extending through an aperture in said cylindrical wall into the hollow of said cylindrical member for stabilizing said platform when said member is positioned on said pole and said method further includes the step of said lineman on said platform moving said shim means into contact with said pole.

* * * * *